June 14, 1960 P. B. BOOTH 2,940,540
GAS SCRUBBER
Filed Aug. 27, 1958

INVENTOR.
Philip B. Booth
BY
Richard O. Church
Attorney

United States Patent Office 2,940,540
Patented June 14, 1960

2,940,540

GAS SCRUBBER

Philip B. Booth, Rowayton, Conn., assignor to Dorr-Oliver Incorporated, Stamford, Conn., a corporation of Delaware Filed Aug. 27, 1958, Ser. No. 757,527

7 Claims. (Cl. 183—25)

This invention generally relates to improved means for separating finely divided solids from gases and more particularly to improvements in gas scrubbing apparatus such as disclosed in U.S. Letters Patent 2,621,754. In this type of apparatus, solids-laden gas streams are caused to impinge at high velocities against the surface of a scrubbing liquid. The solids contained in the gases are driven into and retained by the scrubbing liquid and the cleansed gases are reflected from the surface of the scrubbing liquid.

Apparatus of this kind, commonly referred to as Doyle scrubbers, are of particular utility when treating gases containing such extremely fine solids that the solids cannot be removed efficiently by more conventional means. In current practice, the scrubbing unit is enclosed within a generally rectilinear chamber. Conduit means located within the chamber direct incoming gases through a constriction or throttle to increase the velocity of the gases. The resulting high velocity gases are discharged from the throttle and impinged directly against the surface of the liquid bath contained within the rectilinear bottom of the scrubber or impingement chamber. The solids contained in the gas stream are driven into and retained by the liquid bath while the gas stream, having expended much of its energy through expansion and turbulent interaction with the liquid bath, is reflected from the surface of the liquid at a low velocity. The dust-diminished gas stream leaves the impingement chamber and enters a spray eliminating chamber wherein much of the remaining kinetic energy of the gases is dissipated to enable separation of moisture entrained by the gases in their passage through the impingement chamber.

Scrubbing liquid is continually circulated throughout the impingement chamber with its level controlled in order that an optimum distance be established between the bottom of the throttle and the top surface of the liquid. Ordinarily, this distance will be about one-half inch or less. In addition to maintaining a proper height of liquid within the impingement chamber, circulation of the scrubbing liquid through such chamber is necessary in order to provide a vehicle by which the separated solids may be continually removed from the impingement chamber.

Apparatus of the above described type, while extremely efficient in separating finely divided solids from gases, is subject to certain operational and design disabilities.

One of the more serious operational disabilities is caused by the accumulation of solids within the bottom of the rectilinear impingement chamber. As there is a practical limitation to the velocity with which the scrubbing liquid may be circulated through the impingement chamber, solids tend to settle out of the scrubbing liquid and accumulate on the bottom of the impingement chamber. When these accumulations of solids become great enough, the operation of the scrubber must be interrupted to clean out the solids.

Operational difficulties are also encountered with this type of apparatus due to the quantity of scrubbing liquid entrained in the cleansed treated gases and carried out of the scrubber mechanism therewith. As the detention time of the gases within the spray eliminating chamber is necessarily limited, gases relatively free of entrained moisture cannot be produced if the moisture content of the gases leaving the impingement chamber is too high. While the loss of water in itself is not of great importance, it is often desired, for process purposes, to produce a cleansed gas as low as possible in moisture content. Thus, this apparatus is subject to the disability that it cannot produce a cleansed gas sufficiently low in entrained moisture content.

The capacity of a single Doyle scrubber unit is rather limited. It is necessary to install a plurality of separate treatment chambers, generally connected in series, when large gas volumes are to be accommodated. This is disadvantageous both as to initial cost and the increased floor space required of such multiple units.

To maintain appropriate gas velocities throughout, the scrubbing units must be designed to contain a pressure, which may either be positive or negative depending on whether the gas impeller, or fan, is positioned on the inlet or exit side of the scrubber. Present Doyle scrubbers, due to their poor structural design, suffer from the disadvantage that unnecessarily heavy gauge metal and reinforcement is required to contain these pressures within the rectilinear chambers.

It is, therefore, an object of this invention to prevent the accumulation of solids within the bottom of the impingement chamber.

It is a further object of this invention to prevent excessive amounts of moisture from being carried out of the gas scrubbing unit with the cleansed gases.

Yet another object of this invention is to reduce the quantities of scrubbing liquid required in operating these gas scrubbing units.

Another object of this invention is to improve the design of gas scrubbing units in order that they may have greater structural rigidity, require less floor space and require less materials of construction.

Quite simply, the present invention accomplishes the above objectives by mounting the gas scrubbing apparatus within a generally cylindrical horizontal tank.

By enclosing the scrubbing or impingement chamber within a substantial curvilinear structure, turbulence within both the scrubbing liquid and the impinged freeboard gases is materially increased.

Greater turbulence within the liquid bath causes the separated solids to be maintained in a state of turbulent suspension within the liquid bath. By so suspending the separated solids in the scrubbing liquid, frequent shutdowns for cleaning are greatly eliminated as the solids are prevented from accumulating in the corners and along the bottom of the scrubber. Further, this increased turbulence in the scrubbing liquid results in greatly reduced liquid requirements. As the scrubbing liquid will retain a greater quantity of solids per unit volume if the liquid is continuously agitated, the turbulent liquid is capable of carrying more solids per unit volume from the impingement chamber, thus making a reduction in the rate of flow of the liquid through the impingement chamber possible.

Increased turbulence within the freeboard causes a greater dissipation of the kinetic energy of the impinged gases thus enabling greater efficiency in the separation of the entrained moisture from the impinged gases. Accordingly, this increased freeboard turbulence enables the discharge of drier cleansed gases.

By utilizing a cylindrical tank for enclosing this apparatus, many design improvements, in addition to the previously noted process advantages, are gained.

First, a curvilinear design is much sounder from a a structural standpoint than a rectilinear design. As the chambers must contain either positive or negative gas pressures, the surrounding structure of the gas scrubber must be strong enough to contain these pressures. Conventional designs enclose the gas scrubbing apparatus in substantially rhombic shaped tanks. These must be constructed of unnecessarily heavy gauge metal and require suitable reinforcement to withstand such pressures. The use of the horizontal cylinder, however, will enable the use of thinner metal plate.

Second, the horizontal cylindrical tank enables positioning a plurality of treatment zones within a single enclosure. Thus, both a gas scrubbing and a gas disengaging zone can be functionally disposed within a single unit. Also, when large volumes of gases must be treated, a series of gas impingement zones and final gas disengaging zone or zones can be integrated within a single shell or tank structure.

Third, a cylindrical tank of this sort, encompassed by dished end portions, is both easier and cheaper to construct than the conventional rhombic form.

In order that it may clearly be understood and readily carried into effect, the invention will now be described, by way of example, with reference to the accompanying drawing.

Figures 1, 2:
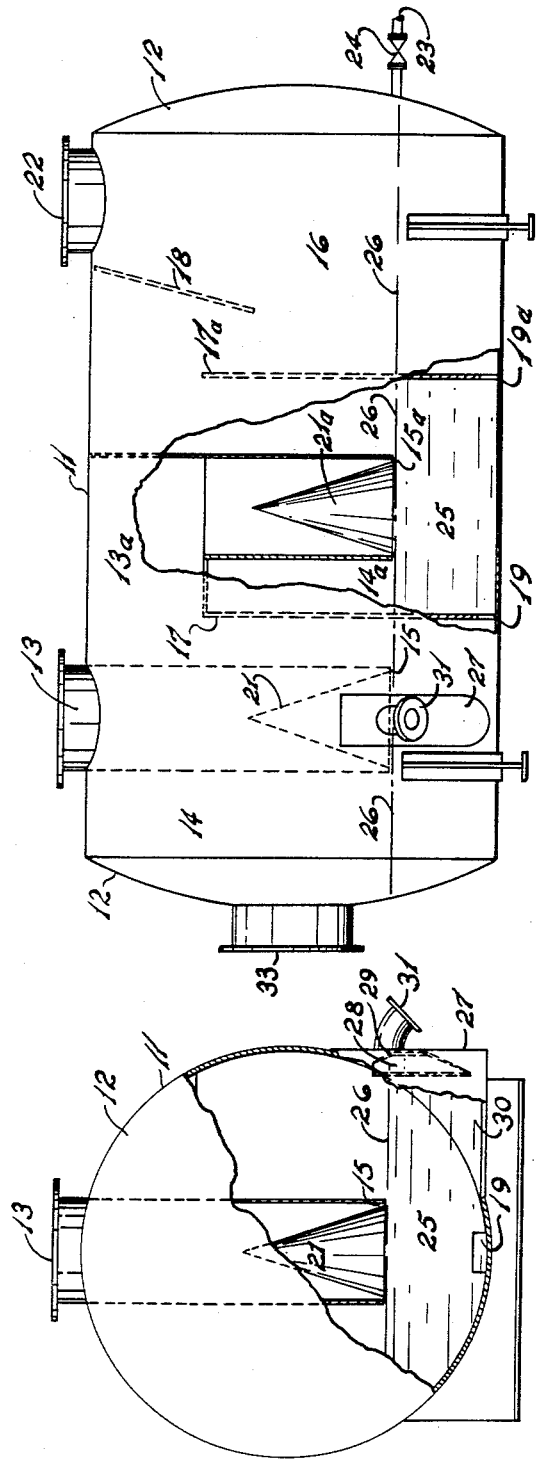
Figure 1 is a front elevation, partially in section, of a preferred embodiment of this invention.
Figure 2 is a side elevation, partially in section, of the apparatus shown in Figure 1.

Referring to the drawings there is illustrated a substantially cylindrical horizontal tank 11 enclosed at its ends by outwardly concave end members 12.

The interior of tank 11 is divided into a plurality of treatment zones including at least one impingement zone and at least one spray-eliminating zone. As illustrated in Figure 1, cylindrical tank 11 is divided into two gas impingement zones, 14 and 14a, and a spray-eliminating zone 16. Impingement zone 14 is separated from impingement zone 14a by means of vertical baffle 17 that extends from a point adjacent the bottom of tank 11 and terminates at a point spaced away from the top of tank 11. Impingement zone 14a is separated from spray eliminating zone 16 by means of a vertical baffle 17a that extends from the bottom of tank 11 to a point spaced away from the top of tank 11. A baffle 18 depends from the top of tank 11 in a generally downward direction into spray-eliminating zone 16 and terminates at a point somewhat below the upper edge of baffle 17a. Orifices 19 and 19a are located at the bottom of baffles 17 and 17a and provide submerged communication between treatment zones 14, 14a and 16.

Gas conduits 13 and 13a extend downwardly into impingement zones 14 and 14a. Conical gas throttles 21 and 21a, which may be fixedly or adjustably mounted, are positioned concentrically within the lower ends of gas conduits 13 and 13a to establish annular gas discharge orifices 15 and 15a.

Conduit 23, valved as at 24, is mounted in the lower portion of spray-eliminating zone 16. Weir box 27, shown schematically in Fig. 2, is essentially comprised of an upwardly extending conduit 28, an adjustable weir 29, a liquid reservoir chamber 30 in free communication between the bottom of tank 11 and weir box 27, and an overflow conduit 31.

An inspection plate 33 may be located in an end member 12 to provide access to the interior of cylindrical tank 11.

In operation, scrubbing liquid is admitted through conduit 23 into the interior of tank 11 to maintain a liquid bath 25 at a level 26 within all treatment zones. Adjustable weir 29 is positioned vertically to establish a liquid surface 26 of bath 25 at a level adjacent below discharge orifices 15 and 15a. Valve 24 controls the rate at which scrubbing liquid flows through the gas scrubber and, as noted, weir 29 regulates and maintains the depth of the scrubbing liquid.

Gases containing fine solids in suspension are introduced into the scrubber via inlet conduit 13 and are directed downwardly against the periphery of conical throttle 21. The velocity of the incoming gases, as they move through the throttle, progressively increases until they are discharged at annular orifice 15. The discharged high velocity gases impinge upon and are driven, along with their entrained solids, against and into the surface of the liquid bath 25. The solids are retained within the liquid bath while the gases escape from the surface of the liquid at low velocities. The reflected low velocity gas stream rises into the upper part of impingement zone 14 and is conducted via conduit 13a downwardly around the periphery of cone throttle 21a and into impingement zone 14a. As in impingement zone 14, gases introduced into impingement zone 14a are accelerated around conical throttle 21a and are discharged at annular orifice 15a to impinge as high velocity gases against and into the surface 26 of liquid bath 25. Solids not removed from the gases in impingement zone 14 are retained by liquid bath 25 in impingement zone 14a and gases are reflected at low velocities into the upper or freeboard section of of this zone 14a.

The gases which have now passed through impingement zones 14 and 14a are substantially free of solids. However, due to the turbulent contact of the high velocity gas stream with the liquid bath, considerable quantities of moisture are entrained in the gases. For this reason, the gases are conducted over baffle 17a, under baffle 18 and into spray-eliminating zone 16. Herein much of the kinetic energy of the gases is dissipated thus enabling the entrained moisture to settle out of the gas stream and fall back into the surface of the water bath 25. The cleansed gases are then discharged as at conduit 22.

From the above description of the drawings, it may readily be seen how the objects of this invention are accomplished by utilizing a substantially cylindrical tank to enclose the gas scrubbing apparatus. The gases discharged through orifices 15 and 15a impinge upon the surface of the liquid bath 25 approximately parallel to the side of the cylindrical tank. As these gases penetrate downwardly into the liquid bath, the path of the gases becomes more and more perpendicular to the cylindrical side walls. As a result, greater turbulence is imparted to the liquid bath by the high velocity gases due to this enforced change of direction of the gases.

This greater turbulence continually agitates the water bath 25 and maintains the separated solids uniformly suspended therein. By so suspending the solids within the water bath 25, the accumulation of deposits of settled solids along the bottom of the cylindrical tank is greatly prevented. Further, this cylindrical design eliminates dead areas which are necessarily found adjacent the corners in conventional rectilinear designed units.

As the curvilinear structure results in greater turbulence within the liquid bath, so too is it responsible for greater turbulence of the gases within the freeboard area. This greater turbulence and enforced change of direction imparted to the freeboard gases dissipates a portion of the kinetic energy of the gases and enables a greater percentage of entrained liquids to settle out of such gases. This, of course, results in a treated gas containing a lower proportion of entrained liquid particles than result when using conventional rectilinear designed tanks.

In addition to the above advantages of providing better separation efficiencies, removing the need for frequent shut-downs for cleaning, reducing the quantity of wash liquid necessary by maintaining a higher percentage of solids suspended within the washed liquid, and producing a cleansed gas low in entrained liquids, several other important advantages accrue. By this design, fabrication of the unit becomes much simpler. First, the impingement chamber and the spray-eliminating chamber can be easily positioned within a single shell. Also, when large volumes of gases need be treated, additional impingement chambers, either connected in parallel or series, may readily be positioned within the same shell. With this design, all of the impingement chambers may utilize one or more spray-eliminating chambers also located within the single shell.

By fabricating a single shell in the form of a cylinder with dished heads, considerable weight reduction can be achieved due to the fact that thinner plate, with less reinforcing material, can be used. Further, space requirements within a given plant are reduced since all splash chambers and spray-eliminating chambers are positioned within the single shell and duct work connecting the various chambers is eliminated.

While the invention has been described with particularity in relation to a substantially cylindrical vessel, it is understood that other equivalents, such as spherical vessels, are within the scope of this invention. The essence of this invention, as defined in the following claims, lies in the concept that a greater turbulence can be imparted to the liquids and gases within the treatment zones if such zones are defined within a substantially curvilinear structure.

I claim:

1. Apparatus for removing finely divided solids from gases comprising a closed vessel adapted to receive and contain said gases and adapted to contain a liquid bath in the bottom portion thereof; controllable means for introducing a liquid into said vessel and establishing a liquid bath over the bottom portion thereof; overflow means for withdrawing liquid from said vessel associated with means for controlling the liquid level within said vessel; a plurality of zones within said vessel including an impingement zone and spray-eliminating zone, said zones being defined by the interior walls of said vessel, upwardly extending baffles attached to the bottom and sidewalls of said vessel terminating at a point above said liquid bath and below the uppermost portion of said vessel, and by downwardly extending baffles attached to the top and side walls of said vessel terminating at a point below the uppermost point of said upwardly extending baffles and above the surface of said liquid bath; orifice means adjacent the bottom of said upwardly extending baffles to provide submerged communication between said treatment zones; means for introducing said gases into said impingement zone; means for increasing the velocity of said gases introduced into said impingement zone associated with means for impinging said gases in said impingement zone against and into said liquid bath; means for discharging gases from said impingement zone to said spray-eliminating zone; and means for discharging gases from said spray-eliminating zone; including the improvement that said vessel is of substantially horizontally disposed cylinder shape with said zones arranged therein in horizontal sequence, said cylindrical shape enabling the maintaining of turbulent conditions within said liquid bath for maintaining the solids in suspension and also the maintaining of turbulent condition in the space overlying the said bath, that said means for introducing the liquid is disposed substantially at the gas outlet end of the vessel, that said overflow means is disposed substantially at the gas inlet end of said vessel, and that said means for introducing said gases are arranged to extend downwardly substantially at right angles to the axis of the vessel.

2. Apparatus according to claim 1 in which said means for introducing gases into said impingement zone comprises conduit means extending downwardly from an upper portion of said vessel to a point adjacent above the surface of said liquid bath.

3. Apparatus according to claim 2 in which said means for increasing the velocity of said gases introduced into said impingement zone associated with means for impinging said gases in said impingement zone against and into said liquid bath comprise an upright conical member positioned within said downwardly extending conduit with its axis parallel to said downwardly extending conduit and its base adjacent the bottom of said downwardly extending conduit.

4. Apparatus according to claim 3 in which said conical member is adjustably mounted to enable vertical positioning of said conical member within said downwardly extending conduit.

5. Apparatus according to claim 1 in which said means for withdrawing liquid from said vessel associated with means for controlling the liquid level within said vessel comprises in combination a weir box located adjacent the bottom of said vessel extending to an elevation above said liquid bath, a discharge orifice located adjacent the upper portion of said weir box, and conduit means extending from a lower portion of said weir box to a point adjacent said discharge orifice, said conduit means having a vertically adjustable overflow weir at its uppermost end.

6. Apparatus for removing finely divided solids from gases comprising a closed vessel adapted to receive gases to be treated and to contain a liquid bath in the bottom portion thereof; said container comprising a substantially cylindrical, horizontally disposed tank having a gas inlet end and a gas outlet end and said vessel being divided into a plurality of horizontally adjacent treatment chambers by upwardly extending baffles attached to the interior diameter of said vessel and terminating at a point below the uppermost portion of said vessel, said treatment zones comprising at least two horizontally adjacent impingement zones and at least one spray-eliminating zone in horizontal sequence; said impingement zones comprising conduit means for introducing gases to be treated, throttle means for increasing the velocity of said gases located within said conduit means, and orifice means at the bottom portion of said conduit means for downwardly discharging gases to be treated at high velocities; means for discharging gases from a first impingement zone to the next successive impingement zone; means for discharging gases from a last impingement zone to said spray eliminating zone; baffle means within said spray eliminating zone depending from the top of said zone; valve means associated with said vessel for introducing a liquid into said vessel and located substantially at the gas outlet end thereof; overflow means for establishing and maintaining a liquid bath within said vessel and means for controlling the level of said liquid bath; orifice means located in the bottom portion of said upwardly extending baffles providing submerged communication between said several zones; and means for discharging gases from said spray-eliminating zone.

7. Apparatus according to claim 6 wherein said overflow means for withdrawing liquid from said vessel associated with means for controlling the liquid level within said vessel comprises in combination a weir box located adjacent the bottom of said vessel extending to an elevation above said liquid bath, a discharge orifice located adjacent the upper portion of said weir box, and conduit means extending from a lower portion of said weir box to a point adjacent said discharge orifice, said conduit means having a vertically adjustable overflow weir at its uppermost end.

References Cited in the file of this patent

UNITED STATES PATENTS

| 1,694,116 | Catron | Dec. 4, 1928 |
| 2,233,520 | De Vigan | Mar. 4, 1941 |
| 2,621,754 | Doyle | Dec. 16, 1952 |

FOREIGN PATENTS

| 142,085 | Australia | July 9, 1951 |